US009028653B2

(12) United States Patent
Kwak et al.

(10) Patent No.: US 9,028,653 B2
(45) Date of Patent: May 12, 2015

(54) EVAPORATIVE DESALINATION DEVICE OF MULTI STAGE AND MULTI EFFECT USING SOLAR HEAT

(75) Inventors: Hee Youl Kwak, Daejeon (KR); Eung Sang Yoon, Daejeon (KR); Moon Chang Joo, Daejeon (KR); Hong Jin Joo, Incheon (KR); Kyoung Ho Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 581 days.

(21) Appl. No.: 13/446,308

(22) Filed: Apr. 13, 2012

(65) Prior Publication Data

US 2013/0270100 A1    Oct. 17, 2013

(51) Int. Cl.
    B01D 1/26     (2006.01)
    B01D 3/06     (2006.01)
    B01D 5/00     (2006.01)
    C02F 1/14     (2006.01)
    B01D 1/00     (2006.01)
    C02F 1/16     (2006.01)
    C02F 103/08   (2006.01)

(52) U.S. Cl.
    CPC ............. B01D 3/065 (2013.01); *C02F 2103/08* (2013.01); *C02F 2303/10* (2013.01); B01D 1/0058 (2013.01); *C02F 2301/08* (2013.01); B01D 1/26 (2013.01); B01D 5/0036 (2013.01); B01D 1/0035 (2013.01); *C02F 1/14* (2013.01); *C02F 1/16* (2013.01)

(58) Field of Classification Search
    CPC ...... B01D 1/0035; B01D 1/0058; B01D 1/26; B01D 5/0036; C02F 1/04; C02F 1/14; C02F 1/16; C02F 2103/08; C02F 2301/08; C02F 2303/10

USPC .......................... 202/174, 185.1, 195; 203/10
    See application file for complete search history.

(56) References Cited

U.S. PATENT DOCUMENTS

| | | | | |
|---|---|---|---|---|
| 3,607,668 A * | 9/1971 | Williamson | ..................... | 203/11 |
| 3,844,899 A * | 10/1974 | Sager, Jr. | ..................... | 202/173 |
| 4,094,747 A * | 6/1978 | Pfenninger | ..................... | 202/173 |
| 4,211,613 A * | 7/1980 | Meckler | ..................... | 203/11 |
| 4,330,373 A * | 5/1982 | Liu | ..................... | 202/174 |
| 4,376,679 A * | 3/1983 | Liu | ..................... | 203/71 |
| 5,346,592 A * | 9/1994 | Madani | ..................... | 202/176 |
| 5,582,690 A * | 12/1996 | Weinberger et al. | ..................... | 203/10 |
| 5,645,693 A * | 7/1997 | Gode | ..................... | 202/173 |
| 5,925,223 A * | 7/1999 | Simpson et al. | ..................... | 203/11 |
| 6,833,056 B1 * | 12/2004 | Kamiya et al. | ..................... | 202/155 |

(Continued)

*Primary Examiner* — Nina Bhat
*Assistant Examiner* — Jonathan Miller
(74) *Attorney, Agent, or Firm* — Rabin & Berdo, P.C.

(57) ABSTRACT

An evaporative desalination device includes a multi stage vapor generator that generates vapor by passing a hot water supply pipe successively through a plurality of vapor generators to evaporate sea water inside thereof, a multi effect vapor generator that uses vapor in the respective vapor generators as heat source and forms a plurality of evaporator groups which can adjust a number of evaporators disposed inside the respective evaporator groups and produce fresh water according to amounts of supplied vapor to evaporate sea water in the evaporator groups on an outer circumference surface of an evaporation tube by heat of vapor flowing in the evaporation tube, and a discharge unit that condenses vapor in the multi effect generator by sea water to discharge fresh water in liquid state, and returns and supplies portions of discharged sea water to the multi stage vapor generator and the multi effect evaporator.

5 Claims, 2 Drawing Sheets

(56) References Cited

U.S. PATENT DOCUMENTS

| | | | |
|---|---|---|---|
| 7,251,944 B2* | 8/2007 | Holtzapple et al. | 62/93 |
| 7,428,926 B2* | 9/2008 | Heins | 166/266 |
| 7,799,178 B2* | 9/2010 | Eddington | 203/10 |
| 2007/0080100 A1* | 4/2007 | Bowman | 210/175 |
| 2007/0215453 A1* | 9/2007 | Eddington | 203/10 |
| 2008/0017326 A1* | 1/2008 | Hong | 159/24.1 |
| 2010/0078306 A1* | 4/2010 | Alhazmy | 203/10 |
| 2010/0314238 A1* | 12/2010 | Frolov et al. | 203/10 |
| 2011/0198208 A1* | 8/2011 | Olwig et al. | 203/10 |
| 2013/0168224 A1* | 7/2013 | Godshall | 203/10 |

\* cited by examiner

EVAPORATIVE DESALINATION DEVICE OF MULTI STAGE AND MULTI EFFECT USING SOLAR HEAT

BACKGROUND OF THE INVENTION

1. Field of the Invention

The present invention relates to a desalination device producing fresh water by heating sea water in multi stages and multiple effects through forming a plurality of vapor generators that generate vapor, arranging evaporators continuously in a plurality of evaporator groups that desalinate sea water by vapor generated in the respective vapor generators as heat sources and constructing a condenser that condenses the vapor discharged from the multiple evaporators.

2. Description of the Related Art

Generally, processes of obtaining fresh water from sea water are distinguished broadly by processes of systems using thermal energy, mechanical/electrical energy and recycled energy according to their energy sources. There are evaporation/distillation methods, reverse osmosis method, freezing method, electro-dialysis method, etc. for desalination methods. Among these methods, desalination methods using solar energy are distinguished into a method of system applying one evaporator for a single stage effect and a method of system adopting several evaporators for multi effects to enhance a yield of desalination. The systems for multi stage effect are distinguished into a system using MSF (Multi-Stage Flash Distillation) method and a system using MED (Multi-Effect Evaporation) method. Such methods use a high temperature stem or are applied in a large system that manufactures a massive amount of fresh water.

A single stage desalination device of the single effect system manufactures fresh water by providing high temperature water that uses solar heat as a heat source. The desalination device is composed of an evaporator that evaporates sea water integrated with a condenser that liquefies the evaporated vapor.

However, in the single stage desalination device, the high temperature water containing thermal energy evaporates sea water in the device only for one time when generating vapor and is discharged outside in a concentrated and heated liquid state. Therefore, the high temperature water is discharged without consuming all of its thermal energy.

On the other hand, a multi stage desalination device is designed to reuse a discharged heat to reduce waste of vapor and decrease energy for heating. A conventional multi stage desalination device supplies high temperature water to a first evaporator to evaporate sea water and generates vapor to use as a heat source for a second evaporator. Vapor generated in the second evaporator is used as a heat source for a third evaporator and such principle is used for a next following evaporator.

However, when a multi stage desalination device is made according to the size of device, an economic problem arises due to star ability and cost-effectiveness versus an amount of fresh water output. Therefore, a development of a multi stage and multi effect desalination device that can solve such problem is required.

SUMMARY OF THE INVENTION

The object of the present invention is to solve the above problems and provide an evaporative desalination device of multi stage and multi effect using solar heat that can increase fresh water output while enhancing economic feasibility with star ability and cost-effectiveness, through forming a multi stage vapor generator that generates vapor by heating sea water inside thereof according to a temperature of inflowing high temperature water and a multiple evaporator composed of a plurality of evaporator groups that desalinate sea water by using vapor generated in the multi stage vapor generator as heat source as well as constructing a condenser that condenses vapor discharged from the multiple evaporator, thereby not directly discharging waste heat but reusing in multi effects and multi stages.

The other objects and advantages will be described below and will be known by an embodiment of the present invention. Further, the objects and the advantages will be realized by the means and combinations of them presented in claims.

As a means to solve above problem, there is provided an evaporative desalination device of multi stage and multi effect using solar heat comprising: a multi stage vapor generator (10) that generates vapor by passing a hot water supply pipe (12) successively through a plurality of vapor generators (11) to evaporate sea water in the respective vapor generators (11); a multi effect evaporator (20) that evaporates and desalinates sea water in the multi effect evaporator (20) by using vapor in the respective vapor generators (11) as a heat source; a condenser (30) that cools vapor in the multi effect evaporator (20) by using sea water; and a discharge unit (40) that discharges sea water used in the condenser (30) outside but returns and supplies some portions of the discharged sea water to the multi stage vapor generator (10) and the multi effect evaporator (20), and inhales air inside of the multi effect evaporator (20) to make vacuum state in the multi effect evaporator (20).

Further, the multi stage generator (10) determines a number of the vapor generators (11) according to a temperature of hot water in the hot water supply pipe (12) and the respective vapor generators (11) maintain pressure to be decreased gradually lower along an order that the hot water supply pipe (12) passes the vapor generators (11).

Further, the multi effect evaporator (20) comprises: a sea water storage tank (23) that drops stored sea water through a plurality of bored holes (24); an evaporation tube (25) where vapor from the vapor generators (11) flows in from one end thereof to evaporate the dropped sea water on an outer circumference surface of the evaporation tube (25) by heat of vapor; a filter (26) that discharges vapor through filtering foreign substance in vapor evaporated on the evaporation tube (25); and a fresh water storage unit (27) that is connected with the other end of the evaporation tube (25) and stores water condensed in the evaporation tube (25).

Further, the multi effect evaporator (20) comprises a plurality of evaporator groups (22) that use vapor of the plurality of vapor generators (11) as respective heat sources and determines numbers of evaporators (21) that are arranged continuously inside the respective evaporator groups (22) according to vapor amounts of the respective vapor generators (11).

Further, the evaporators (21) are arranged so that the neighboring next rear side evaporators (21) use vapor generated in front side thereof as heat sources.

Further, the multi effect evaporator (20) disposes the plurality of the evaporator groups (22) that construct the multi effect evaporator (20) to be arranged horizontal or vertical.

Further, hot water in the hot water supply pipe (12) is heated by using waste heat from solar heat or industrial process as a heat energy source.

Figure 1:
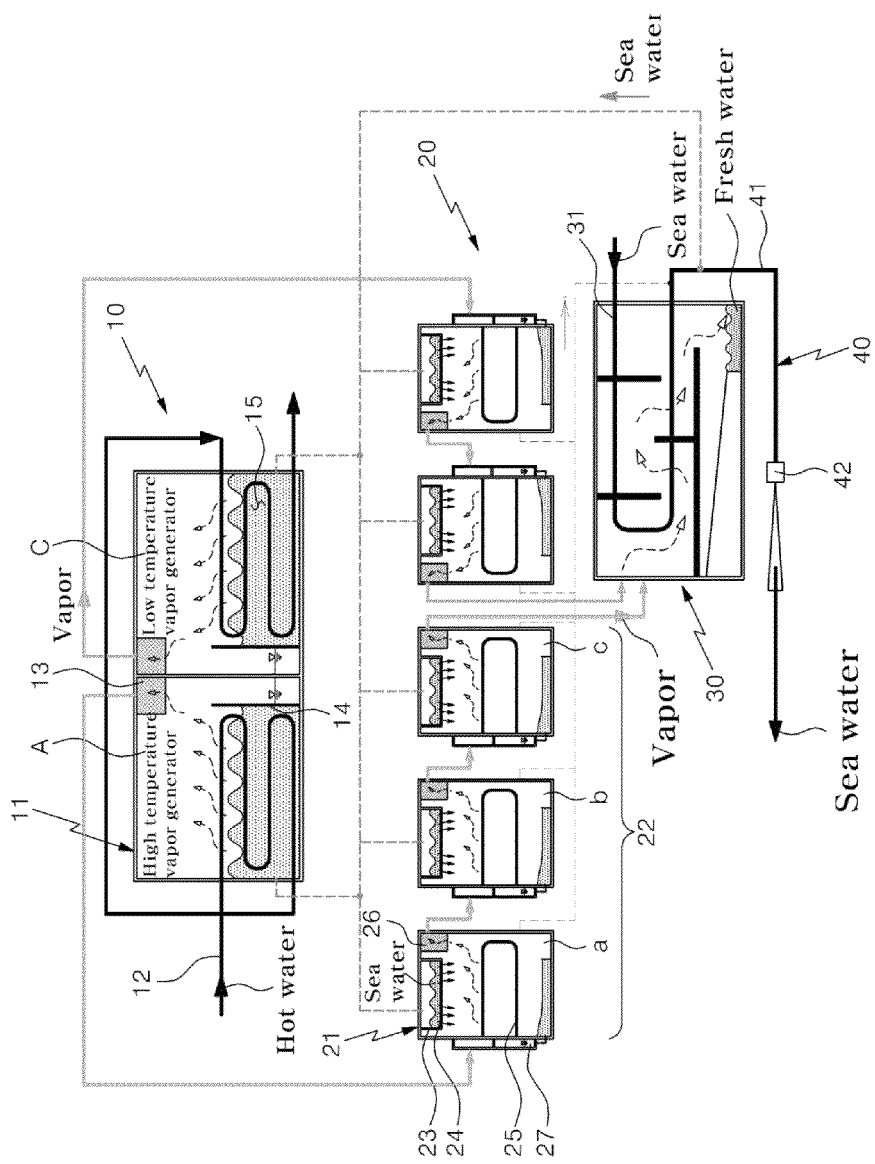
FIG. 1 is a construction illustrating two-stage vapor generators of an evaporative desalination device of multi stage and multi effect using solar heat according to one embodiment of the present invention.

[Brief description of reference numbers of major elements]

| | |
|---|---|
| 10: multi stage vapor generator | 11: vapor generator |
| 12: hot water supply pipe | 13, 26: filter |
| 14: separating wall | 15: storage space |
| 20: multi effect evaporator | 21: evaporator |
| 22: evaporator group | 23: sea water storage tank |
| 24: bored hole | 25: evaporation tube |
| 27: fresh water storage unit | 30: condenser |
| 31: sea water supply pipe | 40: discharge unit |
| 41: sea water discharge pipe | 42: ejector |

DETAILED DESCRIPTION OF THE INVENTION

Before describing embodiments of the present invention in detail, it will be understood that an application of the present invention shall not be limited to the details of the construction and arrangements of the elements recited in the detail description or in the illustrated drawings. The present invention may be realized by other embodiments and performed by various methods. Further, it will be understood that an expression or predicate in the present application related to terms for a direction of device or element (for example: front, back, up, down, top, bottom, left, right, lateral, etc.) are used only to simplify a description of the present invention but not to represent or mean that the related device or element should be simply directed in a specific direction.

The present invention has the following characteristics to accomplish the object of the invention.

Hereinafter, a preferable embodiment of the present invention will be described with reference to the accompanying drawings. Prior to the description, words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, it should be understood that the exemplary embodiments recited in the description and the constructions illustrated in drawings are capable to be substituted by various equivalents and modifications at the time of the present application, since the exemplary embodiments and the constructions are only one of preferable exemplary embodiments but do not represent all the technical spirit of the present invention.

Hereinafter, the evaporative desalination device of multi stage and multi effect using solar heat according to a preferable exemplary embodiment will be described in detail with reference to FIG. 1 and FIG. 2.

As illustrated, the evaporative desalination device of multi stage and multi effect using solar heat includes a multi stage vapor generator (10), a multi effect evaporator (20), a condenser (30), and a discharge unit (40).

In the multi stage vapor generator (10), a hot water supply pipe (12) passes through sea water in the multi stage vapor generator (10) and evaporates sea water inside the multi stage vapor generator (10) by a heat of the hot water supply pipe (12). A plurality of continuously arranged vapor generators (11) forms the multi stage vapor generator (10).

Hot water heated by using solar heat or waste heat (discharged heat) generated from industrial processes as heat energy source flows in the hot water supply pipe (12). Such hot water supply pipe (12) passes successively through inside the plurality of the continuously arranged vapor generators (11). A number of the plural vapor generators (11) may be two to form a two stage vapor generator (shown in FIG. 1) constructed with a high temperature vapor generator (A) and a low temperature vapor generator (C), or may be three to form a three stage vapor generator (shown in FIG. 2) constructed with a high temperature vapor generator (A), a mid temperature vapor generator (B), and a low temperature vapor generator (C), according to a temperature of hot water in hot water supply pipe (12).

When constructing the multi stage vapor generator (10) such as two or three stages as above, the hot water supply pipe (12) passes in order of high temperature vapor generator (A), mid temperature vapor generator (B) and low temperature vapor generator (C) (or high temperature vapor generator (A) and low temperature vapor generator (C)). The continuously arranged vapor generators (11) must obviously maintain pressure to be decreased lower in order along high, mid, and low vapor generators (A, B, and C).

Sea water is filled inside of the each vapor generator (11) of the multi stage vapor generator (10) by a predetermined level. The hot water supply pipe (12) passes through the filled sea water to generate vapor from the sea water heated through heating of the hot water supply pipe (12).

Further, foreign substances in vapor produced in the respective vapor generators (11) are filtered through a filter (13) formed inside of the respective vapor generators (13) (Demister is used in the present invention.). Vapor of the respective vapor generators (11) passed through the filter (13) is used for heat source of the respective evaporator groups (22) of the multi effect evaporator (20) that will be described afterward.

Further, separating walls (14) are formed separately in the respective vapor generators (11) to control water level in a storage space (15) where the hot water supply pipe (12) is installed and to discharge outside the sea water that does not evaporate in the respective vapor generators (11) but overflows.

The multi effect evaporator (20) is installed in a continuous arrangement at a lower end of the multi stage vapor generator (10) mentioned above. In the multi effect evaporator (20), heat of vapor generated in the respective vapor generators (11) of the multi stage vapor generator (10) is used as heat source to evaporate and desalinate sea water in the multi effect evaporator (20).

The multi effect evaporator (20) forms a plurality of evaporators (21) that are continuously arranged into a plurality of evaporator groups (22) according to a number of the installed vapor generators (11).

For example, when the multi effect evaporator (20) is constructed with a two stage vapor generator formed of high temperature vapor generator (A) and low vapor generator (B) as illustrated in FIG. 1, the multi effect evaporator (20) is installed with one of the evaporator groups (22) formed of the plural evaporators (21) using vapor generated in high temperature vapor generator (A) and the other one of the evaporator groups (22) formed of the plural evaporators (21) using vapor generated in low temperature vapor generator (B). Obviously, when the multi effect evaporator (20) is constructed with a three stage vapor generator as illustrated in FIG. 2, the multi effect evaporator (20) should be three evaporator groups (22) using vapor of the respective vapor generators (11) as their heat sources.

A number of the continuously arranged evaporators (21) in each of the evaporator groups (22) is determined according to an amount of vapor supplied from the corresponding vapor generators (11). In case of high temperature vapor generator (A) that can supply the most amount of vapor by sea water of the highest temperature since the hot water supply pipe (12) passes through first, the evaporator group (22) may be formed with more number of the evaporators (21) than in a case of mid temperature vapor generator (B) or low temperature vapor generator (C).

For one exemplary embodiment as illustrated in FIG. 1, when the multi stage vapor generator (10) is formed of two stage, the evaporator group (22) using vapor of high temperature vapor generator (A) as heat source uses three evaporators (21), and the evaporator group (22) using vapor of low temperature generator (B) that supplies relatively less amount of vapor than high temperature vapor generator (A) as heat source uses two evaporators (21). (The multi effect evaporator formed of triple evaporators below high temperature vapor generator (A) and double evaporators below low temperature vapor generator (C), including a condenser that will be described later, accomplishes sextet effective effects.)

Figure 2:
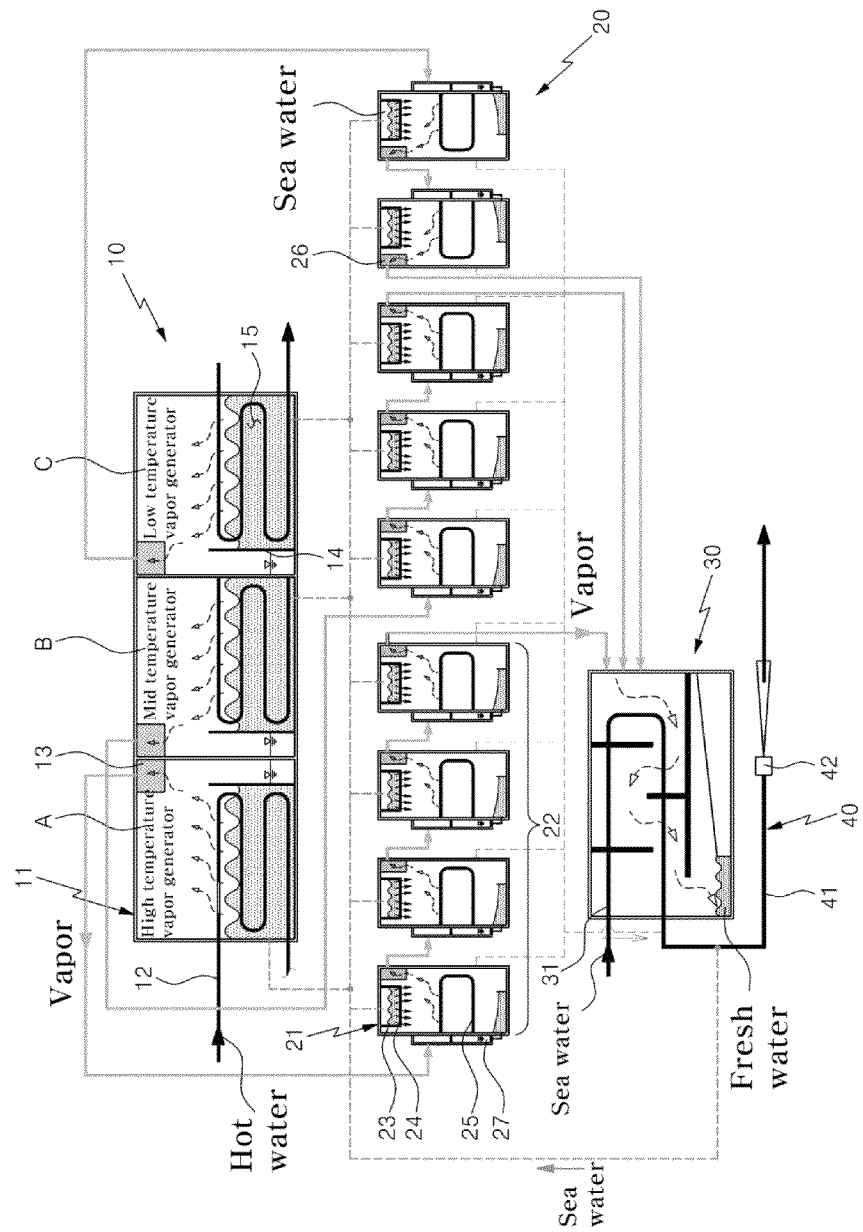
FIG. 2 is a construction illustrating three-stage vapor generators of an evaporative desalination device of multi stage and multi effect using solar heat according to one embodiment of the present invention.

For another exemplary embodiment as illustrated in FIG. 2, when the multi stage vapor generator (10) is formed of three stage, high temperature vapor generator (A) supplies vapor to the evaporator group (22) formed of four evaporators (21), mid temperature vapor generator (B) supplies vapor to the evaporator group (22) formed of three evaporators (21), and low temperature vapor generator (C) supplies vapor to the evaporator group (22) formed of two evaporators (21). (The multi effect evaporator formed of quadruple evaporators below high temperature vapor generator (A), triple evaporators below mid temperature vapor generator (B), and double evaporators below low temperature vapor generator (C), including a condenser that will be described later, accomplishes decuple effective effects.)

Since an amount of generated vapor decreases along an order that the hot water supply pipe (12) passes through, numbers of the evaporators (21) of the evaporator groups (22) that are connected to the respective vapor generators (11) should be decreased gradually.

A structure of such evaporators (21) is described below. Each of the evaporators (21) includes: a sea water storage tank (23) that stores sea water to drop in the evaporator (21) through a plurality of bored holes (24); an evaporation tube (25) that is installed at a lower end of the sea water storage tank (23) and evaporates the dropped sea water on an outer circumference surface of the evaporation tube (25) by a heat of vapor, wherein vapor as heat source is guided into the evaporation tube (25) along a lengthwise direction from one end of the evaporation tube (25); a fresh water storage unit (27) that can store and discharge condensed fresh water evaporated from sea water by being connected to the other end of the evaporation tube (25) passed through the evaporator (21); and a filter (26) that transfers vapor evaporated on the outer circumference surface of the evaporation tube (25) to the other rear side evaporator (21) while filtering foreign substances included in vapor (demister was used in the present invention.).

As illustrated in FIG. 1, vapor of the corresponding vapor generator (11) is supplied as heat source to the evaporation tube (25) of the first installed evaporator (a) among the plurality of evaporators (21). Sea water dropped on the outer circumference surface of the evaporation tube (25) is evaporated by heat of the vapor flowing in the evaporation tube (25). The vapor evaporated from the dropped sea water flows into the evaporation tube (25) of the second evaporator (b) at the rear side of the first evaporator (a) to be used as heat source. The second evaporator (b) also uses heat of the vapor in the evaporation tube (25) supplied from the first evaporator (a) to evaporate and generate vapor from sea water that is dropping, then, supplies the generated vapor also to the evaporation tube (25) of the third evaporator (c) for the third evaporator (c) to evaporate dropping sea water by heat in the evaporation tube (25).

Vapor flowing in the respective evaporators (a), (b) and (c) that evaporate sea water is condensed into liquid state and flows to the fresh water storage unit (27) through the other ends of the respective evaporation tubes (25), thereby the respective evaporators obtain fresh water.

Further, the plurality of such evaporators (21) in the respective evaporator groups (22) may be installed to be continuously arranged horizontal or vertical at the lower end of the multi stage vapor generator (10).

Vapor in the last evaporators (21) of the respective evaporator groups (22) in the former mentioned multi effect evaporator (20) flows to the condenser (30) as illustrated in FIG. 1 and FIG. 2, In other words, as illustrated in FIG. 1, vapor in the last evaporator (21) of the evaporator group (22) formed with three evaporators (21) (the evaporator group (22) using vapor of high temperature vapor generator (A) as heat source) as well as vapor in the last evaporator (21) of the evaporator group (22) formed with two evaporators (21) (the evaporator group (22) using vapor of low temperature vapor generator (C) as heat source) flow into the condenser (30).

The condenser (30) described above is to store fresh water by condensing vapor flows in from the multi effect evaporator (20). Sea water is guided to flow through a sea water supply pipe (31). Then, vapor flows into the condenser (30) is condensed by the sea water supply pipe (31) and stored as fresh water.

Obviously, a separate discharge pipe, etc. should be provided to store fresh water produced in the condenser (30) and the respective evaporators (21) of the multi effect evaporator (20).

The discharge unit (40) takes a shape of a sea water discharge pipe (41) communicating with the sea water supply pipe (31) of the former mentioned condenser (30). The discharge unit (40) should be provided with a general ejector (42) at a middle of such sea water discharge pipe (41) to discharge sea water conveniently.

Further, the ejector (42) is connected with the former mentioned sea water supply pipe (31) as well as with the plurality of evaporators (21) continuously arranged in the respective evaporator groups (22) to enhance evaporation of sea water in the plurality of evaporators (21) by making vacuum state in the respective evaporators (21).

Further, the seawater discharge pipe (41) of the discharge unit (40) discharges sea water used to condense vapor in the condenser (30). However, some portion of the sea water discharged to sea is returned and supplied to the respective vapor generators (11) of the multi stage vapor generator (10) and the respective sea water storage tank (21) of the multi effect evaporator (20).

As described above, the present invention of desalination device having multi stage and multi effect is realized by arranging the vapor generators of high, mid, low, etc. temperatures in parallel that use hot water to evaporate sea water inside thereof and arranging the evaporators properly at the lower ends of the respective vapor generators according to amounts of vapor generated from the arranged respective vapor generators, thereby constructing into the multiple evaporator that desalinate sea water using vapor of the vapor generators as heat source, then, not only increases efficiency of desalinating to fresh water but also improves the economic problem of a series type desalination device arisen due to star ability and cost-effectiveness versus an amount of fresh water output.

Further, the present invention has a superior operational stability due to an excellent star ability when there is a change in energy source as in case of solar energy compared to the conventional multi effect desalination device of MED connected in series.

While the present invention has been particularly shown and described with restriction to the exemplary embodiments, the present invention is not restricted to them but it will be understood by those of ordinary skill in the art that various changes or modifications may be made therein without departing from the spirit and scope of the present invention as defined by the following claims.

What is claimed is:

1. An evaporative desalination device comprising:
    a multi stage vapor generator evaporating sea water and including
        a plurality of vapor generators including
            a high temperature vapor generator, and
            a low temperature vapor generator, and
        a hot water supply pipe of which an inlet portion is disposed in the high temperature vapor generator and an outlet portion is disposed in the low temperature vapor generator, the hot water supply pipe being extended from the high temperature vapor generator to the low temperature vapor generator as a single pipe and successively passing through the plurality of vapor generators;
    a multi effect evaporator evaporating and desalinating the sea water and including a plurality of evaporator groups respectively corresponding to the plurality of vapor generators, each of the evaporator groups including a plurality of evaporators, each evaporator including
        a sea water storage tank disposed in an upper side of the evaporator and dropping the sea water stored in the sea water storage tank through a plurality of bored holes,
        an evaporation tube evaporating the dropped sea water thereonto,
        a filter filtering foreign substances in a vapor evaporated by the evaporation tube and discharging the vapor to a next evaporator, and
        a fresh water storage unit connected to an end of the evaporation tube and storing fresh water condensed in the evaporation tube;
    a condenser including a sea water supply pipe thereinside and cooling the vapor from the multi effect evaporator by using the sea water flowing the sea water supply pipe; and
    a discharge unit discharging the sea water used in the condenser,
    wherein an inlet of the evaporation tube of a first evaporator of a first evaporator groups is connected to an outlet of the high temperature vapor generator, and an inlet of the evaporation tube of a second evaporator of a second evaporator groups is connected to an outlet of the low temperature vapor generator.

2. The device of claim 1, wherein the multi stage generator determines a number of the vapor generators according to a temperature of hot water in the hot water supply pipe.

3. The device of claim 1, wherein the plurality of evaporators are arranged so that a next evaporator utilizes the vapor generated in a front evaporator as heat sources.

4. The device of claim 1, wherein the multi effect evaporator is arranged horizontally or vertically.

5. The device of claim 1, wherein hot water in the hot water supply pipe is heated by using a solar heat or a waste heat from an industrial process as a heat energy source.

* * * * *